US008904216B2

(12) United States Patent
Cullimore

(10) Patent No.: US 8,904,216 B2
(45) Date of Patent: Dec. 2, 2014

(54) MASSIVELY MULTICORE PROCESSOR AND OPERATING SYSTEM TO MANAGE STRANDS IN HARDWARE

(75) Inventor: Ian Henry Stuart Cullimore, Leominster (GB)

(73) Assignee: IOTA Computing, Inc., Palo Alto, CA (US)

(*) Notice: Subject to any disclaimer, the term of this patent is extended or adjusted under 35 U.S.C. 154(b) by 338 days.

(21) Appl. No.: 13/224,938

(22) Filed: Sep. 2, 2011

(65) Prior Publication Data

US 2013/0061070 A1 Mar. 7, 2013

(51) Int. Cl.
| G06F 1/00 | (2006.01) |
| G06F 1/26 | (2006.01) |
| G06F 1/32 | (2006.01) |
| G06F 15/16 | (2006.01) |
| G06F 9/46 | (2006.01) |
| G06F 9/50 | (2006.01) |
| G06F 9/06 | (2006.01) |

(52) U.S. Cl.
CPC ............ G06F 1/3237 (2013.01); G06F 9/5066 (2013.01); G06F 1/324 (2013.01); G06F 1/3287 (2013.01); G06F 9/06 (2013.01)
USPC ........... 713/323; 713/300; 713/320; 709/201; 718/105

(58) Field of Classification Search
None
See application file for complete search history.

(56) References Cited

U.S. PATENT DOCUMENTS

| 5,469,553 A | 11/1995 | Patrick |
| 5,493,689 A | 2/1996 | Waclawsky et al. |
| 5,710,910 A | 1/1998 | Kehl et al. |
| 5,896,499 A | 4/1999 | McKelvey |
| 5,968,133 A | 10/1999 | Latham et al. |
| 6,714,536 B1 | 3/2004 | Dowling |
| 7,002,979 B1 | 2/2006 | Schneider et al. |
| 7,036,064 B1 | 4/2006 | Kebichi et al. |
| 7,055,173 B1 | 5/2006 | Chaganty et al. |
| 7,076,803 B2 | 7/2006 | Bruton, III et al. |
| 7,246,272 B2 | 7/2007 | Cabezas et al. |

(Continued)

FOREIGN PATENT DOCUMENTS

| CN | 1622517 | 6/2005 |
| EP | 1213892 | 6/2002 |

(Continued)

OTHER PUBLICATIONS

Huang et al.: "Embedded firewall based on network processor", 2005, IEEE, Proceedings of the Second International Conference on Embedded Software and Systems (ICESS'05), 7 pages.

(Continued)

*Primary Examiner* — Ji H Bae
(74) *Attorney, Agent, or Firm* — Carr & Ferrell LLP

(57) ABSTRACT

A computing apparatus and corresponding method for operating are disclosed. The computing apparatus may comprise a set of interconnected central processing units (CPUs). Each CPU may embed an operating system including a kernel comprising a protocol stack. At least one of the CPUs may further embed executable instructions for allocating multiple strands among the rest of the CPUs. The protocol stack may comprise a Transmission Control Protocol/Internet Protocol (TCP/IP), a User Datagram Protocol/Internet Protocol (UDP/IP) stack, an Internet Control Message Protocol (ICMP) stack or any other suitable Internet protocol. The method for operating the computing apparatus may comprise receiving input/output (I/O) requests, generating multiple strands according to the I/O requests, and allocating the multiple strands to one or more CPUs.

25 Claims, 6 Drawing Sheets

(56) References Cited

U.S. PATENT DOCUMENTS

| | | | |
|---|---|---|---|
| 7,308,686 | B1 | 12/2007 | Fotland et al. |
| 7,333,437 | B1 | 2/2008 | Glick |
| 7,334,124 | B2 | 2/2008 | Pham et al. |
| 7,363,369 | B2 * | 4/2008 | Banerjee et al. ............ 709/224 |
| 7,424,710 | B1 | 9/2008 | Nelson et al. |
| 7,509,673 | B2 | 3/2009 | Swander et al. |
| 7,568,030 | B2 * | 7/2009 | Banerjee et al. ............ 709/224 |
| 7,657,933 | B2 | 2/2010 | Hussain et al. |
| 7,694,158 | B2 | 4/2010 | Melpignano et al. |
| 7,734,933 | B1 | 6/2010 | Marek et al. |
| 7,770,179 | B1 | 8/2010 | James-Roxby et al. |
| 7,886,340 | B2 | 2/2011 | Carley |
| 8,055,822 | B2 | 11/2011 | Bernstein et al. |
| 8,132,001 | B1 | 3/2012 | Patten et al. |
| 8,335,864 | B2 | 12/2012 | Cullimore |
| 8,607,086 | B2 | 12/2013 | Cullimore |
| 2002/0007420 | A1 | 1/2002 | Eydelman et al. |
| 2002/0167965 | A1 | 11/2002 | Beasley et al. |
| 2003/0084190 | A1 | 5/2003 | Kimball |
| 2004/0049624 | A1 | 3/2004 | Salmonsen |
| 2004/0093520 | A1 | 5/2004 | Lee et al. |
| 2004/0143751 | A1 | 7/2004 | Peikari |
| 2004/0210320 | A1 | 10/2004 | Pandya |
| 2004/0249957 | A1 | 12/2004 | Ekis et al. |
| 2006/0026162 | A1 | 2/2006 | Salmonsen et al. |
| 2006/0123123 | A1 | 6/2006 | Kim et al. |
| 2006/0133370 | A1 | 6/2006 | Eldar |
| 2007/0008976 | A1 | 1/2007 | Meenan |
| 2007/0022421 | A1 | 1/2007 | Lescouet et al. |
| 2007/0118596 | A1 | 5/2007 | Patiejunas |
| 2007/0211633 | A1 | 9/2007 | Gunawardena et al. |
| 2007/0255861 | A1 | 11/2007 | Kain et al. |
| 2008/0046891 | A1 | 2/2008 | Sanchorawala et al. |
| 2008/0109665 | A1 | 5/2008 | Kuhlmann et al. |
| 2008/0177756 | A1 | 7/2008 | Kosche et al. |
| 2009/0126003 | A1 | 5/2009 | Touboul |
| 2009/0158299 | A1 | 6/2009 | Carter |
| 2009/0217020 | A1 | 8/2009 | Yourst |
| 2009/0235263 | A1 | 9/2009 | Furukawa |
| 2010/0005323 | A1 | 1/2010 | Kuroda et al. |
| 2010/0115116 | A1 | 5/2010 | Asnaashari |
| 2010/0131729 | A1 | 5/2010 | Fulcheri et al. |
| 2010/0185719 | A1 | 7/2010 | Howard |
| 2010/0192225 | A1 | 7/2010 | Ma et al. |
| 2011/0002184 | A1 | 1/2011 | Kim |
| 2011/0088037 | A1 | 4/2011 | Glistvain |
| 2011/0107357 | A1 | 5/2011 | Cullimore |
| 2012/0017262 | A1 | 1/2012 | Kapoor et al. |
| 2012/0042088 | A1 | 2/2012 | Cullimore |
| 2013/0061078 | A1 | 3/2013 | Cullimore |
| 2013/0061283 | A1 | 3/2013 | Cullimore et al. |
| 2013/0061313 | A1 | 3/2013 | Cullimore et al. |

FOREIGN PATENT DOCUMENTS

| | | |
|---|---|---|
| TW | 200924424 | 6/2009 |
| WO | WO2011056808 | 5/2011 |
| WO | WO2013032660 | 3/2013 |
| WO | WO2013032661 | 3/2013 |

OTHER PUBLICATIONS

Tan et al.: "A simulation framework for energy-consumption analysis of OS-driven embedded applications," IEEE, vol. 22, No. 9, Sep. 2003.

International Search Report and Written Opinion mailed Dec. 30, 2010 in Patent Cooperation Treaty application No. PCT/US10/55186, filed Nov. 2, 2010.

Benini et al.: "Finite-state machine partitioning for low power," 1998, IEEE.

Anh et al. "Real-Time Operating Systems for Small Microcontrollers," IEEE Micro, Sep.-Oct. 2009. vol. 29, No. 5, p. 30-45. [Accessed Feb. 15, 2011—IEEExplore] http://ieeexplore.ieee.org/xpis/abs_all.jsp?arnumber=5325154.

Ashkenazi et al. "Platform Independent Overall Security Architecture in Multi-Processor System-On-Chip ICs for Use in Mobile Phones and Handheld Devices," World Automation Congress, Jul. 24-26, 2006. [Accessed Feb. 18, 2011—Engineering Village].

Bathen et al. "Inter and Intra Kemel Reuse Analysis Driven Pipelineing on Chip-Multiprocessors," International Symposium on VLSI Design, Automation and Test, Apr. 26-29, 2010. p. 203-207. [Accessed Feb. 16, 2011—IEEExplore] http://ieeexplore.ieee.org/xpis/abs all.jsp?amumber=5496725.

Bolchini et al. "Smart Card Embedded Information Systems: A Methodology for Privacy Oriented Architectural Design," Data & Knowledge Engineering, 2002. vol. 41, No. 2-3, p. 159-182. [Accessed Feb. 16, 2011—ScienceDirect.com].

Cavium Networks, "Nitrox® DPI L7 Content Processor Family," Accessed on Feb. 16, 2011 at http://www.caviumnetworks.com/processor_NITROX-DPI.html.

Cavium Networks, "Nitrox® Lite," Accessed on Feb. 16, 2011 at http://www.caviumnetworks.com/processor_securitLnitroxLite.htm.

Ferrante et al. "Application-Driven Optimization of VLIW Architectures: A Hardware-Software Approach," 11th IEEE Real Time and Embedded Technology and Applications Symposium, Mar. 7-10, 2005. p. 128-137. [Accessed Feb. 15, 2011—IEEExplore] http://ieeexplore.ieee.org/xpls/abs_all.jsp?arnumber=1388380.

"IP Multimedia Subsystems," Freescale Semiconductor, 2006. (brochure) [Accessed Feb. 16, 2011] http://cacheJreescale.com/files/32biUdoc/brochure/BRIMSSOLUTIONS.pdf.

Green Hills Software, "1-l-velOSityTM Real-Time Microkemel," Accessed on Feb. 16, 2011 at http://www.ghs.com/products/micro_velosity.html.

"µ-velOSity Microkernel," (datasheet) Green Hills Software, Inc., 2006.

Hattori. "Challenges for Low-Power Embedded SOC's," International Symposium on VLSI Design, Automation and Test, Apr. 25-27, 2007. p. 1. [Accessed Feb. 16, 2011—IEEExplore] http://ieeexplore.ieee.org/xpis/abs_all.jsp?arnumber=4239406.

Journal of Techonology & Science, "Express Logic, Inc.; Express Logic and IAR Systems Team Up to Provide ThreadX RTOS Support in IAR Embedded Workbench IDE for Freescale ColdFire," Accessed on Feb. 16, 2011 at http://proquest.umi.com.mutex.gmu.edu/pqdweb?index=7 &did=1541305 . . . .

Kakaountas et al. "Implementation of HSSec: A High-Speed Cryptographic Co-Processor," IEEE Conference on Emerging Technologies and Factory Automation, Sep. 25-28, 2007. p. 625-631. [Accessed Feb. 16, 2011—IEEExplore] http://ieeexplorejeee.org/xpls/abs_all.jsp?amumber=4416827.

Ke et al. "Design of PC/1 04 Processor Module Based on ARM," International Conference on Electrical and Control Engineering, Jun. 25-27, 2010. p. 775-777. [Accessed Feb. 17, 2011—IEEExplore] http://ieeexplore.ieee.org/xpis/abs_all.jsp?arnumber=5630566.

Kinebuchi et al. "A Hardware Abstraction Layer for Integrating Real-Time and General-Purpose with Minimal Kernel Modification," Software Technologies for Future Dependable Distributed Systems, Mar. 17, 2009. p. 112-116.[Accessed Feb. 16, 2011—IEEExplore] http://ieeexplore.ieee.org/xpls/abs_all.jsp?arnumber=4804582.

Tabari, et al. "Neural Network Processor for a FPGA-based Multiband Fluorometer Device," International Workshop on Computer Architecture for Machine Perception and Sensing, Aug. 18-20, 2006. p. 198-202. [Accessed Feb. 16, 2011—IEEExplore] http://ieeexplore.ieee.org/xpls/abs_all.jsp?amumber=4350381.

Wang et al. "Towards High-Performance Network Intrusion Prevention System on Multi-core Network Services Processor," 15th International Conference on Parallel and Distributed Systems, Dec. 8-11, 2009. p. 220-227. [Accessed Feb. 16, 2011—IEEExplore].

Wong, William, "16-Bit MCU Invades 8-Bit Territory with 4- by 4-mm Chip," Electronic Design, Sep. 29, 2005. vol. 53, No. 21, p. 32. [Accessed Feb. 16, 2011—Academic Search Complete].

"Yoggie Pico Personal Security Appliance," www.yoggie.com. (archived on May 31, 2009) [Accessed Feb. 16, 2011—Archive.org].

"Yoggie Security Unveils Miniature Hardware Appliance," www.yoggie.com. (archived on May 31, 2009) [Accessed Feb. 16, 2011—Archive.org].

(56) References Cited

OTHER PUBLICATIONS

"Yoggie Unveils Miniature Internet Security Devices for Mac Computers," M2 Telecomworldwire, Oct. 14, 2008. [Accessed Feb. 18, 2011—Academic Source Complete].

International Search Report and Written Opinion mailed Sep. 12, 2012 in Patent Cooperation Treaty application No. PCT/US12/50107, filed Aug. 9, 2012.

International Search Report and Written Opinion mailed Oct. 16, 2012 in Patent Cooperation Treaty application No. PCT/US12/50101, filed Aug. 9, 2012.

Mukherjee. "A Runtime Framework for Parallel Programs" [Online]. Dated Aug. 16, 2006. Retrieved on Sep. 24, 2012. Retrieved from the internet at URL: <http://citeseerx.ist.psu.edu/viewdoc/download-?doi=10.1.122.6849&rep=rep1&type=pdf>, entire document, especially p. III.

Jiang Min. "A design of embedded terminal unit based on ARM and Windowa CE", ICEMI, 8th International Conference on Electronic Measurement and Instruments, 2007, pp. 2-336 to 2-340.

Wang et al. "A survey of embedded operating system", 2001, ceit.aut.ac.ir.

LINFO: "Embedded system definition", Linux Information Project, 2006.

Extended European Search Report mailed Apr. 3, 2013 in European Patent application No. 10828991.9, filed Nov. 2, 2010.

Antoniou, S. "Networking Basics: TCP, UDP, TCP/IP and OSI Model," Oct. 29, 2007, <www.translingal.com/blog/networking-basics-tco=udp-tcpip-osi-models> (retrieved Jun. 4, 2013) 8 pages.

\* cited by examiner

MASSIVELY MULTICORE PROCESSOR AND OPERATING SYSTEM TO MANAGE STRANDS IN HARDWARE

CROSS REFERENCES TO RELATED APPLICATIONS

This nonprovisional patent application is related to U.S. patent application Ser. No. 12/938,290, filed Nov. 2, 2010, titled: "TCP/IP Stack-Based Operating System", which is hereby incorporated by reference in its entirety.

TECHNICAL FIELD

The application generally relates to computing devices having multiple processors and, more specifically, to a multicore processor and operating system based on a protocol stack.

BACKGROUND

Computing devices such as desktop computers, laptop computers, cell phones, smartphones, personal digital assistants (PDA), and many other electronic devices are widely deployed. The primary element of such computing devices is a central processing unit (CPU), or a processor, which is responsible for executing instructions of one or more computer programs. The CPU executes each program instruction in sequence to perform the basic arithmetical, logical, and input/output operations of the computing device. Design and implementation of such devices in general, and CPUs in particular, may vary; however, their fundamental functionalities remain very similar.

Traditionally, in a computing device, the CPU is coupled to a memory and an Input/Output (I/O) subsystem, directly or through a bus, to perform the main functions of computing devices such as inputting and outputting data, processing data, and so forth. The memory may embed an operating system (OS), computer programs, applications, and so forth.

Conventional operating systems are quite similar in architecture, in that each tends to have conventional file and memory operations, storage and graphical user interface operations, and so forth. Architectures of conventional operating systems include a layered design, device drivers, and Application Programming Interfaces (APIs).

In conventional operating systems, a core kernel essentially has master control over all the operations of the overlying software, components, device drivers, applications, and so forth. Traditionally, operating systems implement 'multitasking' through time slicing and sequential allocation of computer resources to various threads and processes. A thread generally runs within a process and shares resources, e.g., memory, with other threads within the same process, whereas a process generally runs 'self-contained' within its own right and completely independently of any other process. In multi-tasking, when a computing device includes a single processor, the operating system instructs the processor to switch between different threads and implement them sequentially. Switching generally happens frequently enough that the user may perceive the threads (or tasks) as running simultaneously.

Many conventional computing devices utilize multiprocessors, or multicore processors, which may truly allocate multiple threads or tasks to run at the same time on different cores. However, conventional multicore processor architectures involve a small number of cores (typically 2, 4, 6, or 8 cores) due to the design limitations of traditional hardware and traditional operating systems. In the case of a conventional multicore processor, the computing device still must implement time slicing and switching between different threads on each of its cores when performing several tasks involving multithreading allocated through the cores. In other words, even conventional multicore processors cannot implement true multitasking.

Traditional processor architectures are also known to experience hanging, cycling, or crashing of the threads when applications are poorly written or purposely malicious. In many instances, a thread crash may bring the whole processor down and result in time-division multiplexing of various threads or processes.

Conventional processor designs use a fixed-frequency, continuously running crystal as the timing mechanism for clocking through microprocessor execution cycles. Thus, the crystal and the processor may continue running even if nothing is being accomplished in the computing device, uselessly cycling around and waiting for a process to actually perform an action. This timing paradigm results in wasted energy. First, the crystal and processor transistors typically execute at their maximum speed at all times, thereby consuming excess power and generating excess heat. Secondly, it is inefficient to continue running clock cycles if no substantive process is actually running. However, these inefficiencies are unavoidable in the conventional operating system design.

Furthermore, conventional operating systems require various modifications and enhancements each year, such as incorporation of new communications layers for Ethernet drivers, Transmission Control Protocol/Internet Protocol (TCP/IP) stacks, Web browsers, and the like. Generally, these new layers are added on top of the conventional operating system, thereby increasing complexity, decreasing performance, and often leading to software crashes and security flaws.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In accordance with various embodiments disclosed herein, a computing device having multiple CPUs interconnected to each other is provided. Each CPU embeds an operating system of an entirely new architecture. This operating system may be based fundamentally around an Internet stack, for example, the TCP/IP stack (instead of including a TCP/IP layer as in a conventional core operating system) and may utilize a conventional interface or similar extensions of the standard Berkeley Sockets (or WinSock) APIs.

In accordance with various embodiments disclosed herein, a computing apparatus is provided. The computing apparatus may comprise a set of interconnected central processing units. Each CPU may embed an operating system (OS) comprising an operating system kernel, the operating system kernel being a state machine and comprising a protocol stack. At least one of the CPUs may further embed executable instructions for allocating multiple strands to one or more other CPUs of the set of interconnected CPUs. It will be understood that a strand, as used herein, is a hardware oriented process and is not necessarily similar to a conventional unit of processing (i.e., a thread) that can be scheduled by an operating system. The Internet stack is a set of communication protocols used for the Internet and other similar network. In one example embodiment, the Internet stack may comprise a TCP/IP stack such that the OS kernel is a TCP/IP stack state machine with proprietary extensions that can be used to change or access internals of the TCP/IP stack state machine. In another example embodiment, the Internet stack may comprise a User Datagram Protocol/Internet Protocol (UDP/IP) stack such that the OS kernel is a UDP/IP stack state machine with proprietary extensions that can be used to change or access internals of the UDP/IP stack state machine. The CPU may comprise a processing unit, a memory and an I/O interface. Executable instructions for the operating system may be stored within one or more types of storage media, such as for example, Read-Only Memory (ROM), Programmable Read-Only Memory (PROM), Field Programmable Read-Only Memory (FPROM), One-Time Programmable Read-Only Memory (OTPROM), One-Time Programmable Non-Volatile Memory (OTP NVM), Erasable Programmable Read-Only Memory (EPROM), and Electrically Erasable Programmable Read-Only Memory (EEPROM or Flash ROM).

The computing apparatus may further comprise at least one asynchronous clock to serve as an internal clock for the operating system. The asynchronous clock may be configurable to automatically stop when clock cycles are no longer needed. A time reference for the operating system kernel may be based, for example, on a Network Time Protocol (NTP), Simple Network Time Protocol (SNTP), or other suitable time protocol from a remote time server. In an example, the operating system may utilize a Sockets style API of sockets and ports on IP addresses for handling I/O requests. The set of CPUs may be interconnected through a bus. Executable instructions for the operating system may be executed through a Sockets API. The at least one CPU that embeds executable instructions for allocating multiple strands may further comprise instructions for generating multiple strands.

According to another embodiment, a method for operating a computing apparatus is provided. The method may comprise receiving I/O requests, generating multiple strands according to the I/O requests, allocating the multiple strands to one or more CPUs of a set of CPUs, and processing the multiple strands. Each CPU may embed an operating system (OS) having a kernel comprising a protocol stack.

According to various embodiments, the I/O requests may be received by a CPU, which embeds executable instructions for allocating multiple strands through multiple CPUs. Allocating multiple strands may comprise communicating data via a network interface.

In one embodiment, the method may further comprise assembling results of multiple strands processing. Executable instructions for the operating system may be stored in a memory and executed through a Sockets API.

According to some embodiments, a non-transitory computer-readable storage medium is provided having embodied instructions thereon, instructions executable by a processor in a computing device to perform a method. The method may comprise receiving an input/output (I/O) request, generating one or more strands according to the I/O request, allocating the one or more strands and/or processes to one or more central processing units (CPUs) of a set of CPUs, wherein each CPU of the set embeds an operating system (OS) having a kernel comprising a protocol stack, and processing the one or more strands and/or processes.

BRIEF DESCRIPTION OF THE DRAWINGS

Embodiments are illustrated by way of example and not limitation in the figures of the accompanying drawings, in which like references indicate similar elements.

DETAILED DESCRIPTION

Figure 1:
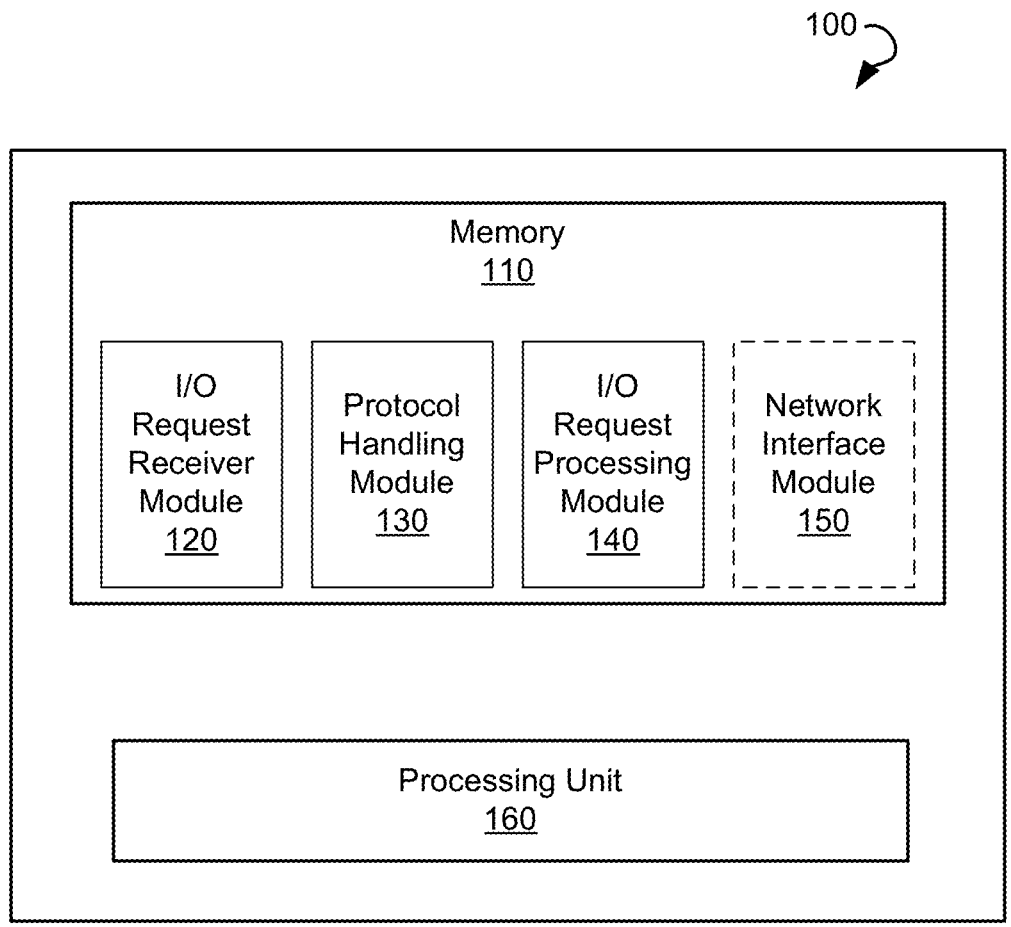
FIG. 1 is a block diagram of a CPU, according to various exemplary embodiments.

Various aspects of the subject matter disclosed herein are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspects may be practiced without these specific details. In other instances, well-known structures and devices are shown in block diagram form in order to facilitate describing one or more aspects.

Various embodiments disclosed herein relate to computing devices comprising a set of interconnected CPUs. The number of the CPUs is not limited, and may be more than 100, or even more than 10,000, depending on specific application of the computing devices. The CPUs may be interconnected (e.g., through one or more buses) so that multiple strands, processes, and tasks can be allocated among a few or even all CPUs, thereby implementing parallelism or true multi-tasking. According to some embodiments, each of some or all of the CPUs is allocated a respective strand.

As used herein, the term "central processing unit" relates to a processor, a microprocessor, a controller, a microcontroller, a chip, or other processing device that carries out arithmetic and logic instructions of an operating system, a computer program, an application, or the like. According to various embodiments disclosed herein, the CPU comprises a processing unit (typically including an arithmetic logic unit and a control unit) and a memory (also known as "registers," or Read Only Memory (ROM)). In some embodiments, the CPU may further comprise an I/O Subsystem (Interface) to allow data transfer between the CPU and any other devices such as another CPU or I/O devices such as a keyboard, mouse, printer, monitor, network controller, and so forth.

The CPU memory may store an operating system based entirely on a protocol stack. A protocol stack, as used herein, is a particular software implementation of a computer networking protocol suite. The protocol stack may be a TCP/IP stack, UDP/IP stack, Internet Control Message Protocol (ICMP) stack, combinations thereof, or other protocols. The operating system embedded in the CPU is fundamentally a state machine. The kernel of the operating system is fundamentally a protocol stack.

Such an operating system is inherently Internet-oriented and all Internet type functionality is natural and inherent in its protocol stack-based processor design and implementation. In addition, such an operating system may operate within small hardware, be run by very compact and efficient software, possess minimal clock cycles for execution, have a natural Internet connectivity model and ultra low power consumption.

FIG. 1 illustrates a block diagram of an exemplary CPU 100. The CPU 100 may be a processor, a microprocessor, a chip, or the like. The CPU 100 may include a memory 110, which may embed an operating system and, optionally, further software applications. The operating system may comprise a kernel to provide communications between software and hardware components/modules. The kernel may be a state machine with extensions and may comprise an Internet stack. The Internet stack may include a set of communication protocols used for the Internet and similar networks. For example, the Internet stack may include a TCP/IP stack so that the OS kernel is a TCP/IP stack state machine. According to another example, the Internet stack includes a UDP/IP stack such that the OS kernel is a UDP/IP stack state machine. According to yet another example, the Internet stack includes a ICMP stack such that the OS kernel is a ICMP stack state machine.

The memory 110 may store one or more modules. Exemplary modules, which may be stored in the memory 110, include an I/O request receiver module 120, a protocol handling module 130, an I/O request processing module 140, and an optional network interface module 150. It will be appreciated by one skilled in the art that the technology described herein encompasses those embodiments where one or more of the modules may be combined with each other or not included in the memory 110 at all.

The CPU 100 may further include a processing unit 160 for executing various instructions and running modules stored in the memory 110. The processing unit 160 may comprise an arithmetic logic to carry out mathematical functions, and a control unit to regulate data flow through the processing unit 160 and the CPU 100. Those skilled in the art would understand that any suitable architecture of the processing unit 160 is applicable.

A module should be generally understood as one or more applications (routines) that perform various system-level functions and may be dynamically loaded and unloaded by hardware and device drivers as required. The modular software components described herein may also be integrated as part of an application specific component.

According to various embodiments, the modules may each include executable instructions for the operating system embedded into CPU 100 and may be executed through a Sockets API.

The I/O request receiver module 120 may be configured to receive I/O requests. The requests may be from an application residing in an application layer of a computing device (as described in further detail with respect to FIG. 2).

The protocol handling module 130 may be configured to handle a specific protocol for the protocol stack state machine implementation. For example, the protocol may be a TCP/IP stack such that the operating system is a TCP/IP stack state machine. In some embodiments, the protocol stack may include a different protocol stack (e.g., a UDP/IP stack or ICMP stack which may be used in addition to or in place of the TCP/IP stack).

The operating system may utilize Sockets style API of sockets and ports on IP addresses for handling I/O requests. The I/O request processing module 140 may be configured to process the I/O requests from an application according to the network protocol using the operating system.

The optional network interface module 150 may be included and is configured to provide an interface between the protocol stack state machine and a network interface. The corresponding network interface may be a hardware unit or a "soft" Ethernet controller.

The CPU 100 may also comprise a clock. The CPU 100 may require a clock to drive the state transitions as the CPU 100, for instance, reads and decodes opcodes. Conventionally this is done by some external oscillator circuitry, typically driven by a fixed-frequency crystal. However, clocking may also be done by more than one crystal, e.g. a high frequency crystal (e.g., 50 MHz) one for the main CPU core, and other (lower frequency) crystals for other uses, e.g., programmable timers, watchdog timers etc. Also, a system comprising for instance a Universal Asynchronous Receiver/Transmitter (UART) and a Network Interface Controller (NIC) also typically require clock inputs of some sort. For instance, a UART may need a reliable clock source all the way from perhaps 300 baud up to 921,600 baud. A NIC running 100 MBit Ethernet would typically need a clock source of 50 MHz or 25 MHz.

Typically, a computer system needs to keep track of time, and can do so using internal counters to keep track of its internal clocks. However, in the case of an Internet-connected device, such as in various embodiments described herein, the device is connected to the Internet and thus has readily available external time sources, for instance from Network Time Protocol (NTP), Simple Network Time Protocol (SNTP), or other suitable time protocols from a remote server (i.e., time protocol servers). For CPU 100, the processing unit 160 that may be included may utilize a time reference using the NTP, SNTP, or other suitable time protocol from a remote time server. Alternatively, the Precision Time Protocol (PTP) can be used for synchronization within a Local Area Network (LAN).

According to some example embodiments, an asynchronous (variable) clock may serve as an internal clock for the operating system for the CPU 100. The asynchronous clock may be configurable to automatically stop when clock cycles are no longer needed. The asynchronous system clock may be restarted by a wake-up "daemon" signal from the SNMP daemon (for example, an incoming data packet).

Furthermore, a combination of the above-mentioned clocking approaches can be used. For example, in the initial phases, the internal clock may be used to trigger the CPU 100. The internal clock may be utilized until the CPU 100 is fully active, at which time most or all of the clock requirements may be transitioned to external time protocols, e.g., using Internet time servers using NTP, SNTP, or other suitable time protocols from a remote time server, or using PTP and SNMP to take over the control of the clocking operations. This would mean that internal clock circuitry for CPU 100 could be turned off, thus conserving power.

Executable instructions for the CPU 100 may be optimized to be more efficient than conventional CPUs so that much lower clock rates are used. A self-adjusting cycle rate may be provided depending on the load and function to be performed. In addition, self-learning or predetermined algorithms for expected scenarios may be utilized to put the CPU 100 into a 'sleep' or 'doze' mode. An expected external event may cause the CPU 100 to exit the doze mode, resume full speed operation to execute necessary operations and handle the external event, and return back to doze. In a doze or a deep sleep mode, the CPU register contents may be read and stored in special registers with long deep-sleep data maintaining capabilities. Such clock saving measures may yield substantial power savings.

Figure 2:
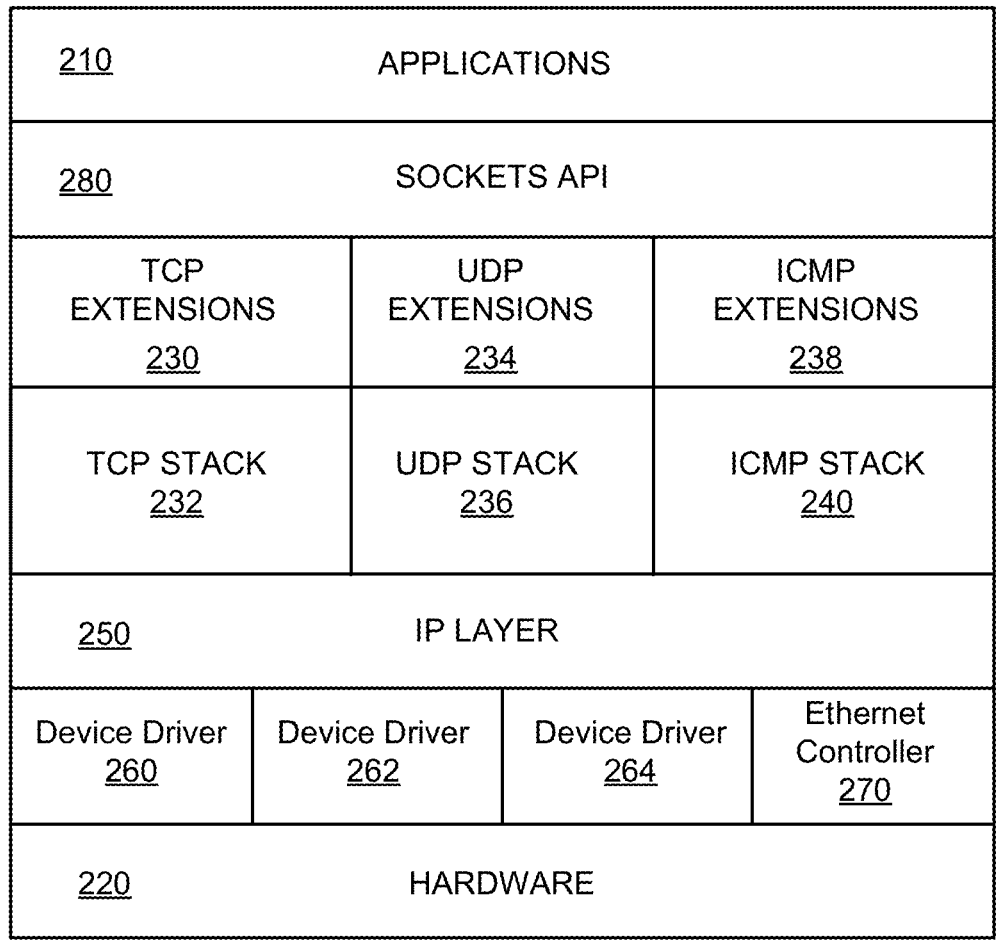
FIG. 2 illustrates an exemplary architecture of an Internet stack state machine-based system, according to various embodiments.

FIG. 2 illustrates an exemplary architecture 200 for a TCP/IP stack state machine-based system, according to various embodiments. The operating system kernel may include various components operating between applications 210 and hardware 220. The kernel may include a TCP stack 232, UDP stack, and/or ICMP stack 240, around which the operating environment may be built. The kernel may include TCP extensions 230, UDP extensions 234, ICMP extensions 238, which together with the respective TCP stack 232, the UDP stack 236, and the ICMP stack 240 are shown above an IP layer 250. The kernel may include one or more device drivers 260, 262, and 264, as well as an Ethernet controller 270.

The API for all operations of the operating system may include the conventional Berkeley Sockets style API of sockets and ports on IP addresses. The Berkeley Sockets may specify the data structures and function calls that interact with the network subsystem of the operating system. The kernel may handle the normal Sockets APIs. The Sockets API 280 may also include some optimized APIs.

Any non-conventional functions (i.e., outside the normal functions used to communicate over the Internet) may be handled in a similar manner (e.g., by opening sockets and binding to ports). Thus, accessing of local input and output (e.g., keyboards, mice, and display screens) may be accomplished through socket/port operations. Consequently, it is quite transparent as to whether a device is local or remote. A keyboard could be at a local host at, for example, 127.0.0.1, or remote at another IP address. Though this transparency may be an aspect of other operating systems, it may not be inherent in the operating system design from the outset. Accordingly, the size of a basic kernel may be very small in a minimal configuration, perhaps as small as a few hundred bytes. It will be understood that the Windows Sockets technology above is mentioned merely for the purpose of providing an example. In contrast to the present technology, in the Windows Sockets technology communications with a display device over the Internet may be cumbersome.

Figure 3:
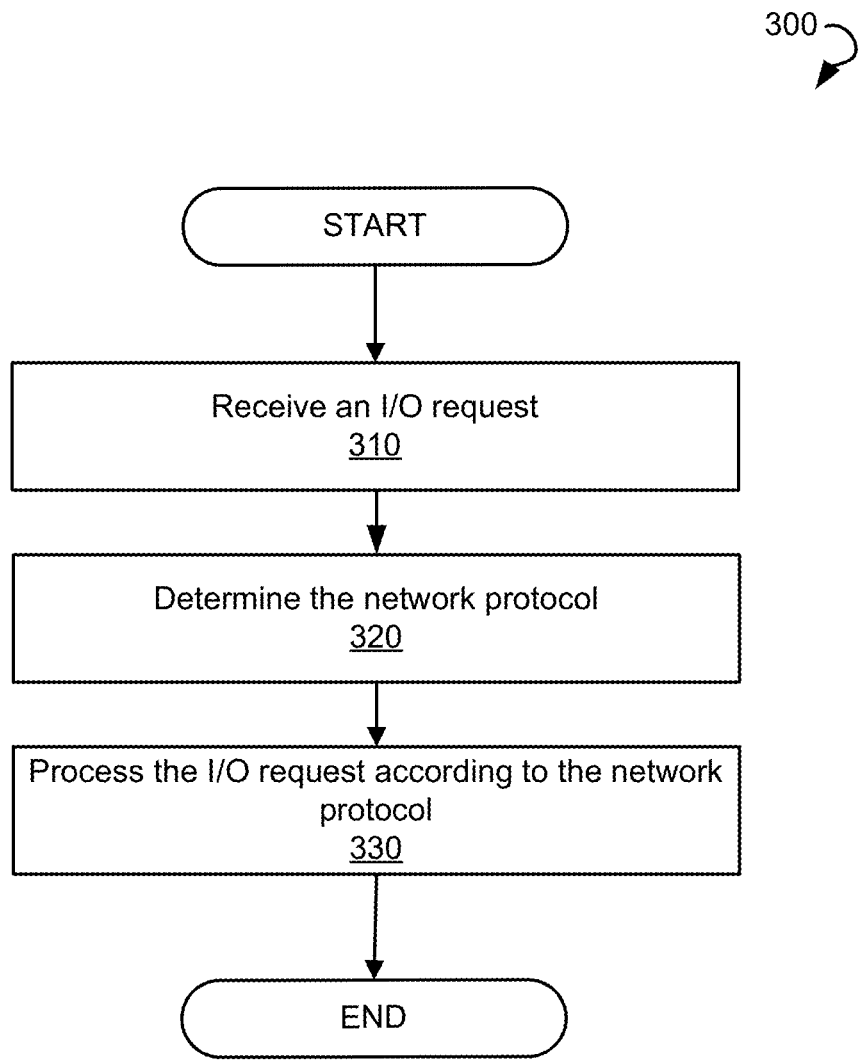
FIG. 3 is a flow chart illustrating a method for a CPU embedding a protocol stack-based operating system, according to an exemplary embodiment.

FIG. 3 is a flow chart illustrating an exemplary method 300 for a CPU embedding a protocol stack-based operating system. The method 300 may commence at operation 310 with receiving an I/O request. The request may be from an application residing in an applications layer 210 of a computing device. In operation 320, the network protocol may be determined. According to some embodiments, the protocol is TCP/IP, so that the operating system is a TCP/IP stack state machine. In some other embodiments, the protocol is UDP/IP. UDP is an unreliable connectionless protocol sitting on top of IP, and TCP is a connection-oriented reliable protocol. The protocol may be a hybrid of TCP and UDP, wherein a data connection stream includes a mixture of UDP and TCP packets. UDP has less overhead and is suitable for lower-importance information, whereas TCP has a higher overhead but essentially guarantees delivery. For instance, a stream of data comprising non-essential information (such as low-importance data) mixed with critical data could better be transmitted over such a hybrid link. This hybrid protocol may be determined in operation 320.

In operation 330, the I/O request may be processed according to the network protocol. The processing may be performed by the state machine that is the operating system (e.g., a TCP/IP stack state machine operating system). The operating system may utilize a Sockets style API of sockets and ports on IP addresses for handling I/O requests. The conventional Berkeley Sockets style API of sockets and ports on IP addresses may be used. The Berkeley Sockets may specify the data structures and function calls that interact with the network subsystem of the operating system.

Figure 4:
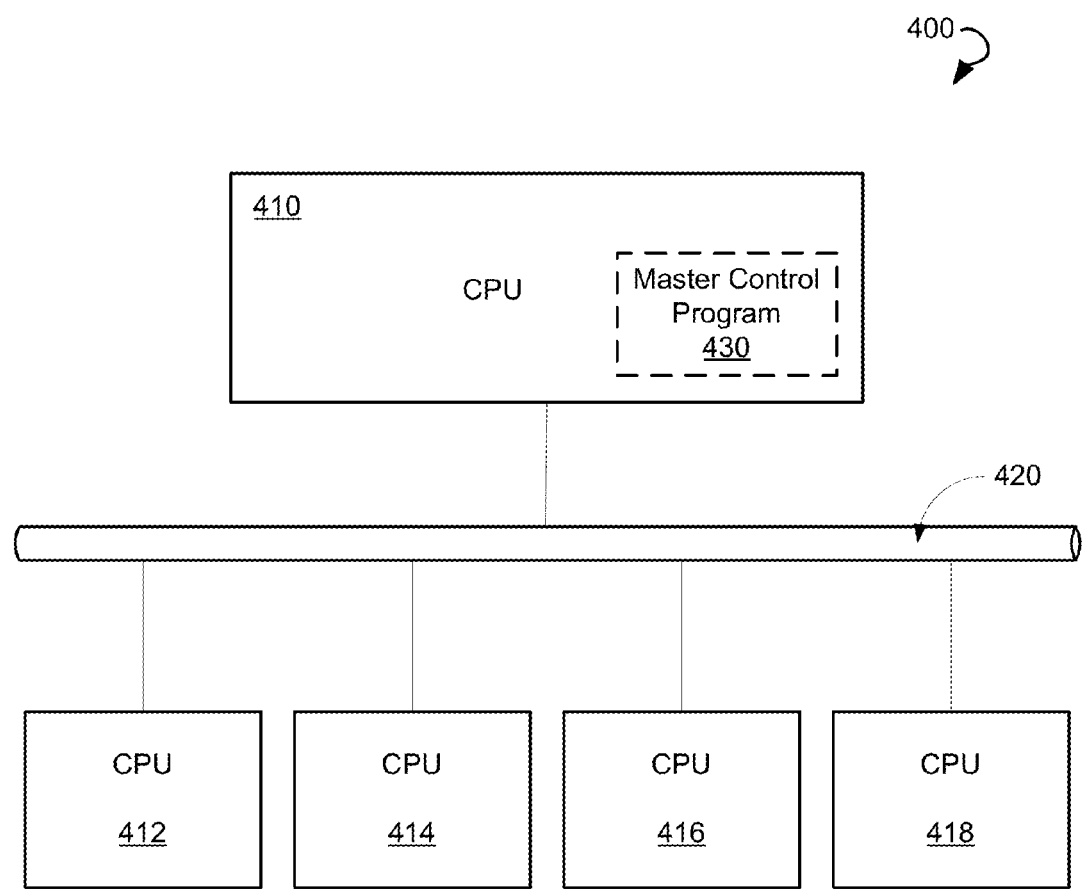
FIG. 4 is a block scheme of a computing device, according to various exemplary embodiments.

FIG. 4 is a block scheme of a computing device 400, according to an exemplary embodiment. The computing device 400 may comprise five CPUs 410, 412, 414, 416, and 418. Despite the fact that five CPUs are shown, it will be appreciated by one skilled in the art that any number of CPUs may be used in the computing device 400. Some embodiments may include up to 10,000 CPUs or even more.

The CPUs 410, 412, 414, 416, and 418 may all be coupled to a bus line 420 so that they may communicate data amongst each other. According to various embodiments disclosed herein, each CPU embeds an operating system based on a protocol stack. The protocol stack may be a TCP/IP protocol stack, UDP/IP stack, combinations thereof (i.e., hybrid stack), or other appropriate protocols. One particular example of the CPU embedding a TCP/IP stack-based operating system is described with reference to FIG. 1.

Although not shown in FIG. 4, the CPUs 410, 412, 414, 416, and 418 may each include a memory storing an operating system and/or any further executable instructions and/or data. The memory can be implemented within the CPU or externally. In one example, all CPUs 410, 412, 414, 416, and 418 may share a single memory coupled to the bus 420. As used herein, the term "memory" refers to any type of long term, short term, volatile, nonvolatile, or other storage devices and is not limited to any particular type of memory or number of memories, or type of media upon which memory is stored.

The CPUs 410, 412, 414, 416, and 418 in the example in FIG. 4 may further comprise an I/O Interface (not shown) implemented as software and/or hardware. One particular example of software implementation of the I/O Interface is shown as I/O Interface Module 150 in FIG. 1. Alternatively, a hardware implementation may comprise an I/O controller, a Network Interface Controller (NIC) as an Ethernet controller, or the like. It will be apparent to those skilled in the art that the I/O interface may support any communication standards and provide communications over a serial connection, parallel connection, firewire connection, Ethernet connection, and so forth.

Each of the CPUs may further comprise a clock (not shown), which can be implemented within each CPU or externally. According to various embodiments, a single clock may be shared by all CPUs.

One or more of the CPUs may embed a Master Control Program (MCP) 430. According to the example in FIG. 4, the CPU 410 embeds the MCP 430. The MCP 430 is an application or a routine for managing operations of the remaining CPUs 412, 414, 416, and 418 and, therefore, the CPU 410 may be considered a "Master Core."More specifically, the MCP 430 may be configured to receive I/O requests from outside devices, generate multiple strands (processes, tasks) according to the I/O requests, and allocate these strands (processes) to the other CPUs 412, 414, 416, and 418 so that the overall computational load is selectively distributed among the CPUs 412, 414, 416, and 418. However, in some embodiments, strands may be allocated to some of the CPUs 412, 414, 416, and 418, or to just one CPU. According to some embodiments, each of a number of CPUs (i.e., one, some, or all of the CPUs) is each allocated a respective strand. After execution of all strands and/or processes allocated to different CPUs, the results of the computations may be assembled in the Master Core for further outputting. Alternatively, the CPUs 412, 414, 416, and 418 may deliver results directly to corresponding external devices. According to some embodiments, the computing device 400 may comprise several Master Cores for processing different types of I/O requests. In yet another embodiment, one Master Core may process all incoming I/O requests, while other Master Cores may be utilized for assembling the output of multiple CPUs, and transmitting the assembled output results to corresponding outside devices. Those who are skilled in the art would readily understand that any possible number of Master Cores is possible, and each Master Core may implement the same or different functions.

According to various exemplary embodiments, whenever a strand or process is 'created' (e.g., by a typical 'C' 'CreateThread( . . . ) function call), the MCP physically allocates a hardware core stack to the strand (or process). An allocated core stack/strand combination may also be referred to as a "core strand". The cores (or core strands) may form a massive array in which core strands may be wired as a block to share resources (e.g., memory), or allowed to share the resources over their interconnects. Cores in the (massive) array of cores may be connected to each other, e.g., interconnected by a web-like structure. Cores may be allocated processes in some embodiments, i.e., cores which are processes or "process cores". Such exemplary process cores are naturally isolated from other process cores since processes run independently of other processes, each process containing their own resources, in contrast to strands where resources may be shared therebetween.

The computing device 400 allows only a certain number of CPUs to operate while the remaining CPUs, not involved in the processing, are turned off. For example, the computing device 400 may comprise 1,000 CPUs and a single Master Core. In response to the I/O request, the Master Core may generate 600 strands (variously within a number of processes) and allocate them to 600 CPUs. The remaining 400 CPUs may be turned off to conserve power. If another 100 strands later become needed, 100 of the 400 CPUs may be turned on in response to the allocating of the 100 strands to them so that the total number of the CPUs executing instructions becomes 700. As clearly shown in this example, the overall power consumption is reduced compared to the traditional system where all processors run all the time, even if there is no process or strand to execute.

The computing device 400 may facilitate greater stability of operations when compared to conventional multicore processors. When one of the strands crashes, for example, due to a poorly written routine or for some other reason, only the CPU running the strand is affected, while other CPUs remain unaffected. This is contrast to conventional systems where the entire multicore processor may become affected by a single strand crash.

Figure 5:
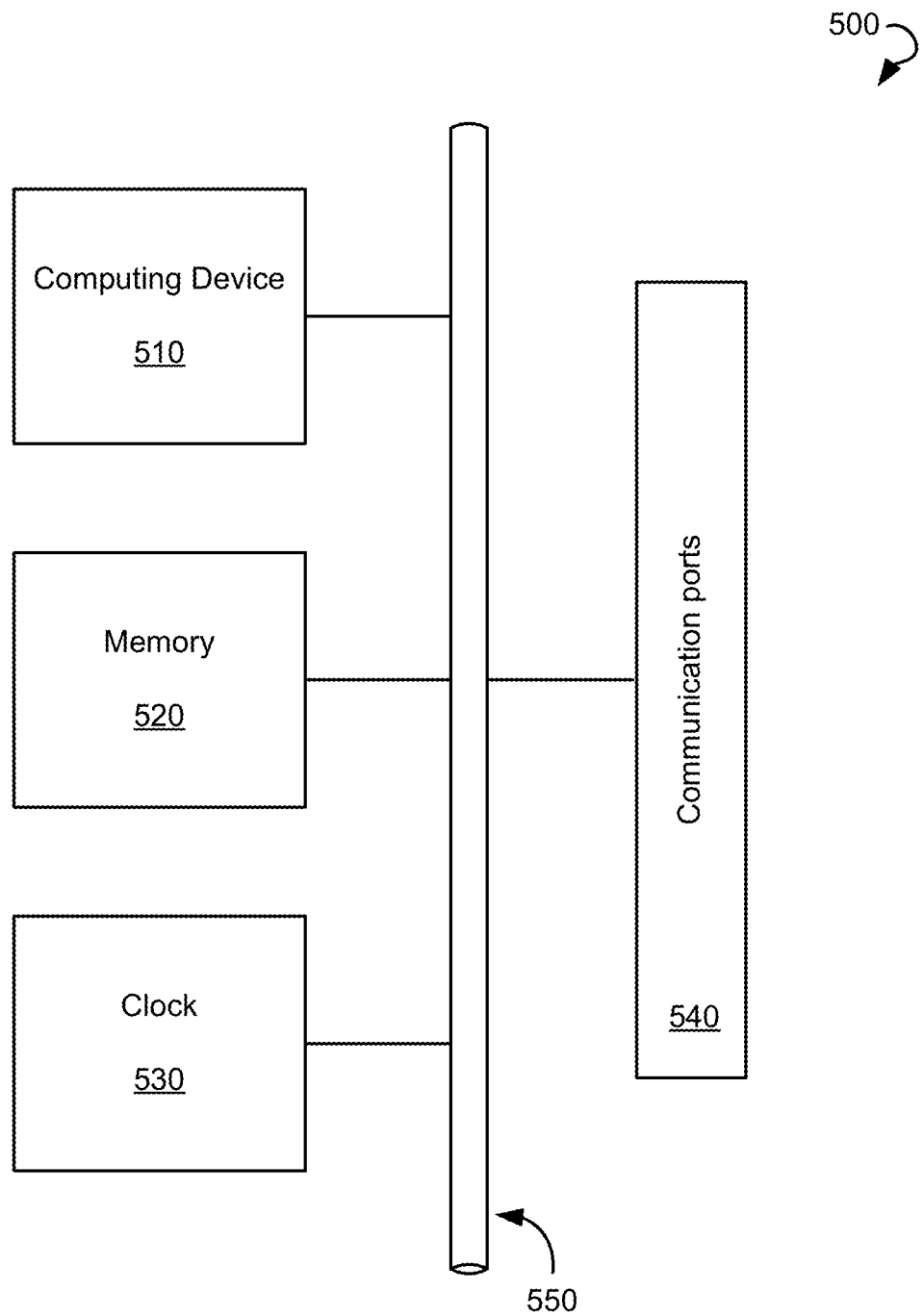
FIG. 5 is a computing environment, according to various exemplary embodiments.

FIG. 5 illustrates an exemplary embodiment of a computing environment 500. The computing environment 500 may comprise a computing device 510 (which is described in greater detail with reference to FIG. 4), a memory 520, a clock 530, and communication ports 540, all of which may be coupled to a bus 550.

The memory 520 may include any memory configured to store and retrieve data. Some examples of the memory 520 include storage devices, such as a hard disk, magnetic tape, any other magnetic medium, a CD-ROM disk, digital video disk (DVD), any other optical medium, any other physical medium with patterns of marks or holes, a RAM, a ROM, a PROM, an EPROM, an EEPROM, a FLASHEPROM, OTPROM, OTP NVM, Flash ROM or any other memory chip or cartridge, or any other medium from which a computer can read instructions. The memory 520 may comprise a data structure configured to hold and organize data. The memory 520 may comprise executable instructions of the operating system and/or other routines and applications. The memory 520 may also comprise a MCP, as described above with reference to FIG. 4.

The clock 530 may serve as an asynchronous clock for the operating system for one or more CPUs of the computing device 510. The asynchronous clock may be configured to automatically stop when clock cycles are not needed.

Communication ports 540 represent a connection interface that allows asynchronous transmission of data between the computing environment 500 and any edge devices such as a keyboard, mouse, monitor, printer, CD-ROM drive, network controller, and so forth.

The computing environment 500 may be implemented as a desktop computer, a laptop computer, a mobile telephone, a smartphone, a PDA, and many other consumer electronic devices.

Figure 6:
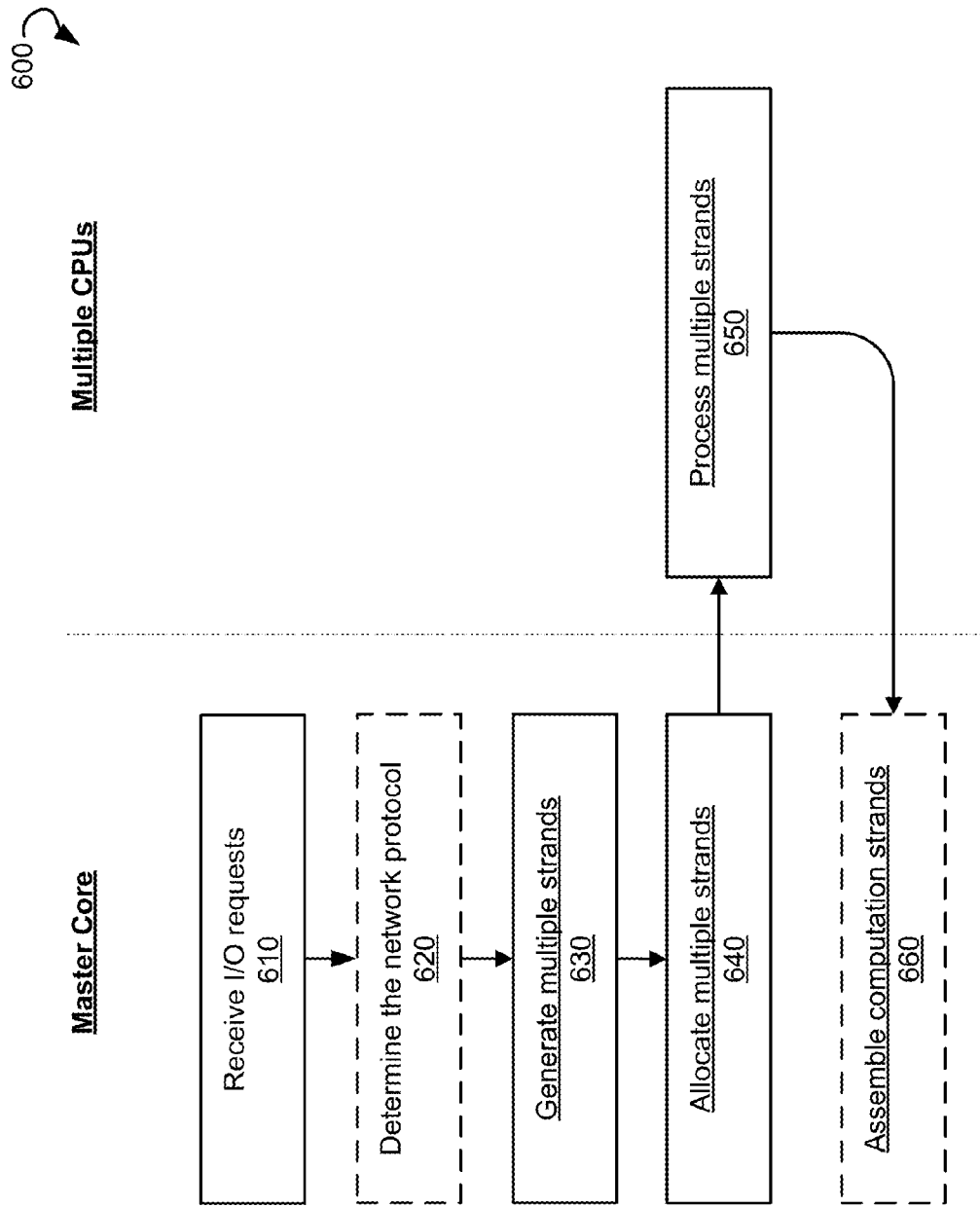
FIG. 6 is a flow chart of a method for processing I/O requests by a computing device comprising multiple CPUs with embedded Internet stack-based operating systems, according to an exemplary embodiment.

FIG. 6 is a flow chart of an exemplary method 600 for processing I/O requests by a computing device comprising multiple CPUs, with the CPUs each embedding a protocol stack-based operating systems.

The method may commence in operation 610, when a CPU embedding a MCP (i.e., a Master Core) receives an I/O request. In optional operation 620, the network protocol may be determined. According to various embodiments, the protocol is TCP/IP, UDP/IP, a combination thereof, or the like. In operation 630, the Master Core may generate multiple strands (e.g., within processes) according to the I/O requests and the determined (optional in operation 620) network protocol. In operation 640, the Master Core may schedule and allocate the multiple strands among one or more CPUs 412, 414, 416 (see FIG. 4) and other CPUs of the computing device. The allocation of multiple strands may include communicating data via a network interface (e.g., via a bus using I/O interfaces of the CPUs).

In operation 650, the strands (or alternatively the processes which contain strands) may be processed in the one or more CPUs. According to various embodiments, the processing at each CPU is performed by the state machine that is the operating system, e.g., a TCP/IP stack state machine operating system. The operating system may utilize Sockets style API of sockets and ports on IP addresses for handling these strands.

In optional operation 660, processing results (e.g., arithmetical or logic results) from multiple CPUs may be assembled by the Master Core for further outputting. According to another example, assembling may be performed within a different CPU, or, alternatively, processing results may be directly transmitted to a corresponding edge device.

The following provides an overview of the functionalities facilitated by protocol stack-based multiple processors, which can be used in different computing devices according to various embodiments disclosed herein.

A conventional operating system may manage internal tasks and external programs in a dictatorial manner, wherein the appearance of multitasking is achieved through rapid allocation of time slices among multiple strands and processes. Such a system may be flexible and of a general purpose. However, applications and unknown driver components have little or no control over their scheduling in such a system.

In contrast to a conventional operating system, the operating system according to the various embodiments disclosed herein is essentially a state machine. This results in the whole environment being inherently cooperative and friendly to the operating system as a state machine model. All systems and application components are built together in an open and symbiotic relationship. Only components actually required in a target system are built into the environment.

In a conventional operating system, the kernel and other systems components include all the normal functions of file and memory management, timers, input and output, TCP/IP, and the like. There are numerous strands and processes going on, such as kernel executive cycles around all the running processes, updating clocks, checking communication ports, updating displays, checking on Ethernet traffic, and so forth. As such, the conventional operating system provides a highly sophisticated and flexible system, but with the downside of a tremendous number of activities (and hence clock cycles and, therefore, energy) going on all the time.

In contrast, an implementation according to various embodiments disclosed herein may include only the required components. As a result, execution times and code sizes may be optimized, resulting in fewer energy cycles. Such computing device may have a number of state machines handling the operations at a lower level and forwarding data packets up through the TCP/IP stack. When no tasks need to be performed, the state machines are idle. Therefore, the protocol stack-based CPUs according to various embodiments disclosed herein eliminate unnecessary internal clock cycles through the use of intelligent tasking, in contrast to conventional multi-tasking.

The ultra-low power aspect of the computing device according to the embodiments disclosed herein may provide greatly improved battery life for various devices. Boot up time for devices may be greatly reduced by executing instructions from the ROM, saving general state information in battery-backed SRAM, and saving crucial microprocessor register setting and other state information in special registers in custom application-specific integrated circuits (ASICs), for example.

A full IP stack typically includes an application layer, transport layer, Internet layer, and link layer. The basic operating system for the computing device may not normally have all the components of a full IP stack. A basic kernel may have, for example, just HTTP on top of TCP on top of IP on top of Ethernet. Alternatively, the kernel may be built with SNMP on UDP on IP on Ethernet. Those who are skilled in the art would readily understand that various possible implementations are possible.

The computing device may also attempt to identify which sub-processes in a larger process need to be executed sequentially and which sub-processes may be executable in parallel. The computing device may provide a model of a set of simple state machines. In complex systems, a State Machine Manager (SMM) may be provided to regulate and control the run flow. In operation, applications register priority and execution parameter requests with the SMM, which in turn handles them accordingly in a fair manner.

Conventionally, multicore processors are designed first, and thereafter an operating system is designed to run on such processors. As a result, the operating system design is limited by compromises dictated by the multicore processor design. The applications are then designed to run on the operating system. The design of the applications is limited by all the limitations dictated by the particular operating system design.

In contrast to this conventional design process, an operating system may be designed first according to the embodiments described herein. Any unnecessary aspects may be removed for the design. A computing device having multiple CPUs may then be designed. The design process may be iterated to make still further reductions down to the essential components.

According to various embodiments, the operating system code executes within a ROM. While saving register contents during a deep sleep, execution within the ROM and as a state machine provide an "instant-on" capability where it may take just milliseconds for the system to resume execution. A RAM memory may be used for only truly read-write data that requires it, while the execute-only code may be stored in the ROM. The slower access times of ROM devices versus RAM devices may not cause an issue, because the instruction cycle times for the system are generally slow, albeit for a reduced number of cycles.

The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire, and fiber optics, among others, including the wires that comprise one embodiment of a bus. Common forms of computer-readable media include, for example, a floppy disk, a flexible disk, a hard disk, magnetic tape, any other magnetic medium, a CD-ROM disk, DVD, any other optical medium, any other physical medium with patterns of marks or holes, a RAM, a PROM, an EPROM, an EEPROM, a FLASHEPROM, any other memory chip or cartridge, or any other medium from which a computer can read.

Various forms of computer-readable media may be involved in carrying one or more sequences of one or more instructions to a CPU for execution. A bus may carry the data to system ROM (or RAM), from which a CPU retrieves and executes the instructions. The instructions received by system ROM (or RAM) may optionally be stored on a fixed disk either before or after execution by a CPU.

The above description is illustrative and not restrictive. Many variations of the embodiments will become apparent to those of skill in the art upon review of this disclosure. The scope of the subject matter should, therefore, be determined not with reference to the above description, but instead should be determined with reference to the appended claims along with their full scope of equivalents.

While the present embodiments have been described in connection with a series of embodiments, these descriptions are not intended to limit the scope of the subject matter to the particular forms set forth herein. It will be further understood that the methods are not necessarily limited to the discrete steps or the order of the steps described. To the contrary, the present descriptions are intended to cover such alternatives, modifications, and equivalents as may be included within the spirit and scope of the subject matter as disclosed herein and defined by the appended claims and otherwise appreciated by one of ordinary skill in the art.

What is claimed is:

1. A computing apparatus, comprising:
    a set of interconnected central processing units (CPUs), each of the CPUs embedding an operating system (OS), the OS comprising an operating system kernel, the operating system kernel being a state machine and based on a network protocol stack, wherein input or output devices each communicatively couple with the computing apparatus using sockets and ports on Internet Protocol (IP) addresses; and
    at least one of the CPUs further embedding executable instructions for allocating multiple strands to one or more other CPUs of the set of interconnected CPUs, the multiple strands being generated according to I/O requests of the input or output devices.

2. The apparatus of claim 1, wherein the one or more other CPUs includes all other CPUs of the set such that the at least one of the CPUs embeds executable instructions for allocating multiple strands to all other CPUs of the set of interconnected CPUs.

3. The apparatus of claim 1, wherein the one or more other CPUs includes less than all of the other CPUs of the set, any of the CPUs not allocated strands being turned off to conserve power.

4. The apparatus of claim 1, wherein the one or more other CPUs includes less than all of the other CPUs of the set, and wherein any of the CPUs not allocated strands are placed in a sleep mode to conserve power.

5. The apparatus of claim 1, wherein the network protocol stack comprises a Transmission Control Protocol/Internet Protocol (TCP/IP) stack such that the OS is a TCP/IP stack state machine.

6. The apparatus of claim 1, wherein the network protocol stack comprises a User Datagram Protocol/Internet Protocol (UDP/IP) stack such that the OS is a UDP/IP stack state machine or Internet Control Message Protocol (ICMP) stack such that the OS is ICMP stack.

7. The apparatus of claim 1, wherein each of the CPUs comprises a processing unit, a memory and an Input/Output (I/O) interface.

8. The apparatus of claim 7, wherein the memory includes one or more of the following memory types: a Read-Only Memory (ROM), Programmable Read-Only Memory (PROM), Field Programmable Read-Only Memory (FPROM), One-Time Programmable Read-Only Memory (OTPROM), One-Time Programmable Non-Volatile Memory (OTP NVM), Erasable Programmable Read-Only Memory (EPROM), and Electrically Erasable Programmable Read-Only Memory (EEPROM or Flash ROM), the executable instructions for the OS being stored within the one or more memory types.

9. The apparatus of claim 1, further comprising at least one asynchronous clock to serve as an internal clock for the OS.

10. The apparatus of claim 9, wherein the asynchronous clock is configurable to automatically stop when clock cycles are no longer needed.

11. The apparatus of claim 1, wherein a time reference for the OS kernel is based on a Network Time Protocol (NTP), Simple Network Time Protocol (SNTP), or a Precision Time Protocol (PTP).

12. The apparatus of claim 1, wherein the set of interconnected CPUs are interconnected through a bus.

13. The apparatus of claim 1, wherein executable instructions for the operating system are executed through a Sockets applications programming interface (API).

14. The apparatus of claim 1, wherein the OS utilizes a Sockets style API of sockets and ports on Internet Protocol (IP) addresses for handling I/O requests.

15. The apparatus of claim 1, wherein the at least one CPU embedding executable instructions for allocating multiple strands further comprises instructions for generating multiple strands.

16. The apparatus of claim 1, where the set of interconnected CPUs comprises 1000 interconnected CPUs.

17. A method, comprising:
receiving a plurality of input/output (I/O) requests;
generating one or more strands for each of the plurality of I/O requests;
selecting a central processing unit (CPU) from a set of CPUs for each of the plurality of I/O requests based on a request type, wherein each of the set of CPUs is configured to process a different type of request;
allocating the one or more strands to the (CPUs), wherein each CPU embeds an operating system (OS) having a kernel based on a network protocol stack; and
processing the one or more strands.

18. The method of claim 17, wherein any of the CPUs not allocated at least one of the strands is turned off to conserve power.

19. The method of claim 17, wherein the network protocol stack comprises a Transmission Control Protocol/Internet Protocol (TCP/IP) stack such that the OS is a TCP/IP stack state machine.

20. The method of claim 17, wherein the network protocol stack comprises a User Datagram Protocol/Internet Protocol (UDP/IP) stack such that the OS is a UDP/IP stack state machine or Internet Control Message Protocol (ICMP) stack such that the OS is ICMP stack.

21. The method of claim 17, wherein at least one of the CPUs of the set of CPUs receives I/O requests, the at least one CPU embedding executable instructions for allocating the multiple strands to a number of the other CPUs of the set of CPUs.

22. The method of claim 17, wherein allocating comprises communicating data via a network interface.

23. The method of claim 17, further comprising assembling results of the processing.

24. The method of claim 17, wherein executable instructions for the operating system are stored in one or more of the following memory types: Read-Only Memory (ROM), Programmable Read-Only Memory (PROM), Field Programmable Read-Only Memory (FPROM), One-Time Programmable Read-Only Memory (OTPROM), One-Time Programmable Non-Volatile Memory (OTP NVM), Erasable Programmable Read-Only Memory (EPROM), and Electrically Erasable Programmable Read-Only Memory (EEPROM or Flash ROM), wherein the executable instructions are executed through a Sockets applications programming interface (API).

25. A non-transitory computer-readable storage medium having embodied instructions thereon, instructions executable by a processor in a computing device to perform a method, the method comprising:
receiving an input/output (I/O) request;
generating one or more strands according to the I/O request;
allocating the one or more strands to one or more central processing units (CPUs) of a set of CPUs, wherein each CPU of the set embeds an operating system (OS), the OS comprising a kernel that is a state machine based on a network protocol stack; and processing the one or more strands, wherein input or output devices each communicatively couple with the computing device using sockets and ports on Internet Protocol (IP) addresses.

* * * * *